March 29, 1966  D. E. SANFORD  3,242,800
AUTOMATIC FOCUSING DEVICE
Filed June 24, 1963  4 Sheets-Sheet 1

INVENTOR.
DONALD E. SANFORD
BY
ATTORNEY

March 29, 1966 D. E. SANFORD 3,242,800
AUTOMATIC FOCUSING DEVICE
Filed June 24, 1963 4 Sheets-Sheet 2

INVENTOR.
DONALD E. SANFORD
BY
ATTORNEY

March 29, 1966     D. E. SANFORD     3,242,800
AUTOMATIC FOCUSING DEVICE

Filed June 24, 1963     4 Sheets-Sheet 3

INVENTOR.
DONALD E. SANFORD
BY
ATTORNEY

March 29, 1966   D. E. SANFORD   3,242,800
AUTOMATIC FOCUSING DEVICE
Filed June 24, 1963   4 Sheets-Sheet 4
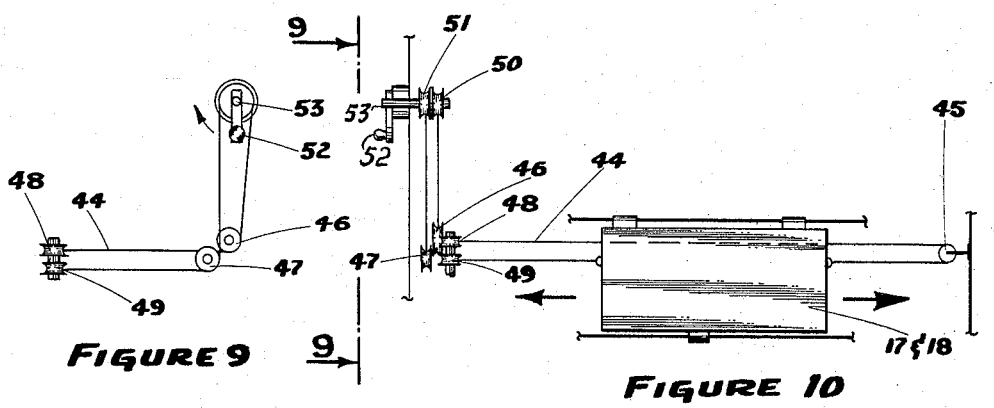
FIGURE 9
FIGURE 10
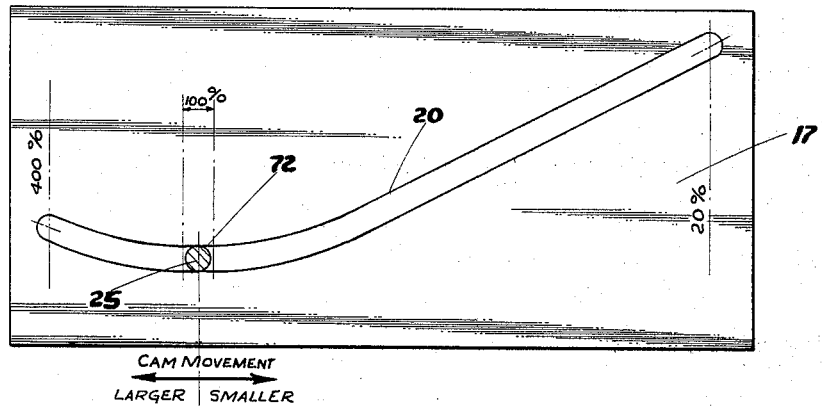
FIGURE 11
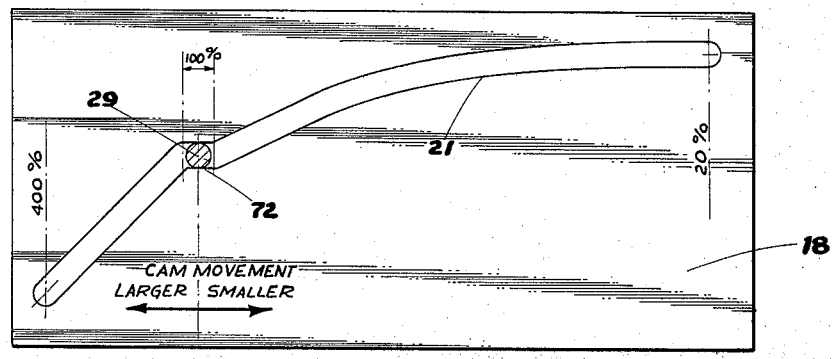
FIGURE 12
INVENTOR.
DONALD E. SANFORD
BY
ATTORNEY

3,242,800
AUTOMATIC FOCUSING DEVICE
Donald E. Sanford, 2171 SW. 37th Ave.,
Fort Lauderdale, Fla.
Filed June 24, 1963, Ser. No. 289,802
5 Claims. (Cl. 88—24)

This invention relates to focusing means and particularly to those of a construction suitable for employment with large copying cameras, enlargers and the like and which require precise positioning of the optical elements in order to secure very sharp focus and required size reproduction. This is particularly true of process cameras of the type used in the graphic arts.

It is an object of the invention to provide an apparatus by which the lens board of a camera, carrying the objective, and a copy holder carrying the material to be copied by the camera, will be capable of adjustment to or from one another and to and from the film holder to secure accurate and precise focussing and required size reproduction.

It is an object of the invention to provide an apparatus of this kind by which a lens and the material to be copied can be moved simultaneously by means of cams which operate on a focal length ratio; which can be manufactured at relatively low cost and is very accurate and of long life.

More particularly, the invention contemplates the provision of a camera lens board and a copy holder movable either toward or away from one another; and toward or away from the film holder of a cam unit effective by its movement initiated by crank manipulation, to rotate pinions carrying pulleys, and which pulleys, by means of cables connected respectively to the lens board and copy holder, will be operative to move these elements toward or away from one another as required for focus and for specific size reproduction.

With these and other objects to be hereinafter set forth in view, I have devised the arrangement of parts to be described and more particularly point out in the claims appended hereto.

In the accompanying drawings, wherein an illustrative embodiment of the invention is disclosed, FIG. 1 is a side elevational view of a camera consisting of a copy holder, a film holder, a lens carrier and their mounting and provided with the improved focussing means;

FIG. 9 is a view, taken on the line 9—9 of FIG. 10, of the crank means, cables and pulleys for manually moving the cam plate unit;

FIG. 10 is a view taken at right angles to that of FIG. 9;

FIG. 11 is a face view of the slotted cam plate effects the movement of the copy holder, and FIG. 12 is a view of the slotted cam plate which effects the movement of the lens board.

Figure 1:
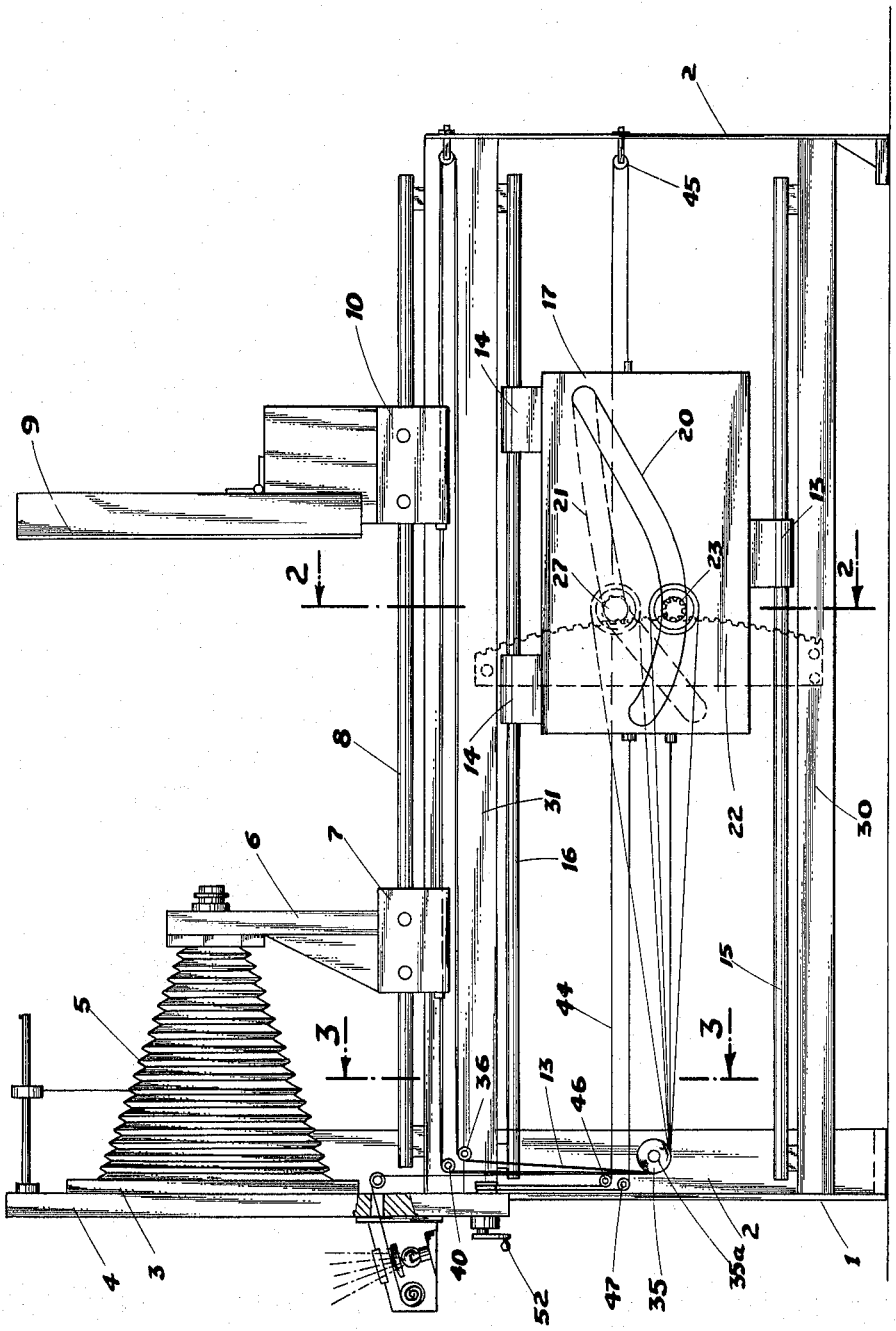

Referring to the drawings, 1 indicates generally the frame or supporting structure of a process copying camera or other similar optical instrument. The supporting structure or frame includes vertical legs 2 resting on the floor or other supporting surface.

The camera shown at 3, has a film carrier 4 and a bellows 5 connected to the adjustable lens board or holder 6. The lens board 6 is provided at its lower end with a guiding member 7 that is slidably mounted on a pair of parallel rails 8 fixed along the top of the supporting structure or frame 1 and extending longitudinally along the same.

Figure 2:
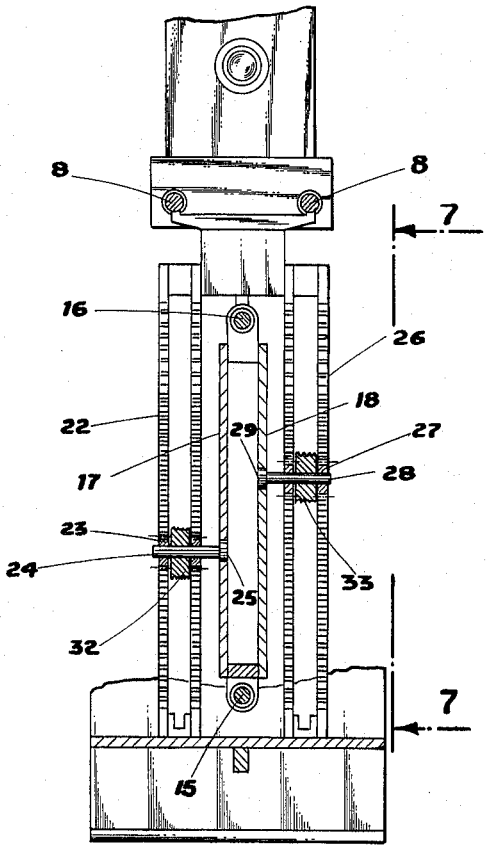
FIG. 2 is a sectional view, taken substantially on the line 2—2 of FIG. 1, looking in the direction of the arrows.
Figure 4:
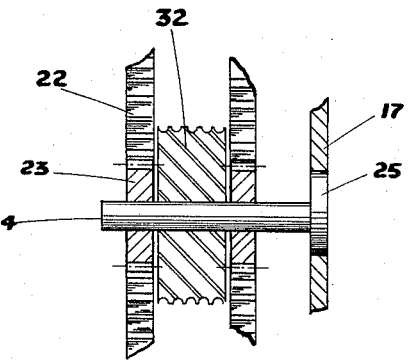
FIG. 4 is a sectional view showing one of the cam followers carrying a pinion and a pulley, the latter being used for the drive of the lens holder or copy holder.

The copy holder for holding the material to be copied by the camera 3, is shown at 9, the same being provided at its lower end with a yoke or guide piece 10, which is also slidable along the length of the rails 8. Mounted in the supporting structure or frame 1 below the rails 8 are rails 15 and 16 and connected cam plates 17 and 18 are slidably movable along the length of said rails 15 and 16. The cam plates 17 and 18 are connected together to form a cam unit and they are maintained in spaced apart relation as shown in FIG. 2 and are provided at the top with guide lugs 14 which are slidably guided along the rail 16. The cam unit is provided at the bottom with a guide lug 13 slidably guided along the length of the guide rail 15.

The cam plate shown at 17 is that which effects movement of the copy carrier 9, while the cam plate 18 is that which effects the movement of the lens board 6 of the camera. Cam plate 17 is formed with a cam slot 20 constituting the driving means for the copy carrier 9, while the cam slot of the form shown at 21 in the cam plate 18 constitutes the driving means for the camera lens board.

Located to one side of the cam plate 17 is an arcuate toothed rack 22 having its teeth in mesh with a pinion 23 mounted on a spindle 24 carrying a head at one end constituting a cam follower 25 operative in the cam slot 20. At the opposite side of the cam plate 18 is a similar arcuate rack 26 having its teeth engaged by the pinion 27 fixed on the spindle 28 which has a head constituting a follower 29 operative in the cam slot 21. The racks 22 and 26 are connected together by being fixedly secured at their lower ends to a longitudinally extending frame element 30 forming part of the supporting structure 1, and fastened at their upper ends to the bed portion 31 of the supporting structure. The cam plates 17 and 18 thus form a cam unit which is slidably moved along the rails 15 and 16 between the racks 22 and 26.

Figure 5:
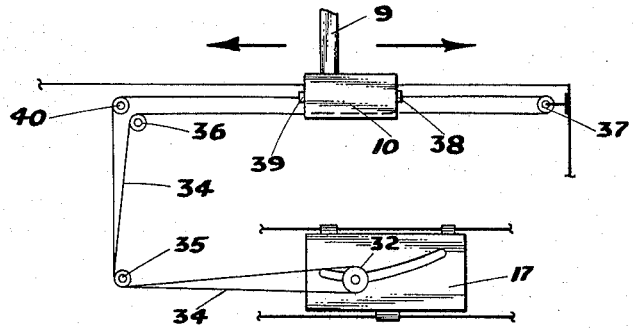
FIG. 5 is a diagrammatic view showing the mechanism for adjusting the position of the copy holder.
Figure 6:
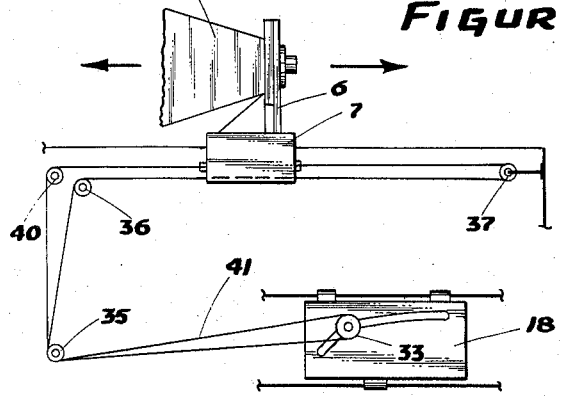
FIG. 6 is a diagrammatic view of the mechanism for shifting the lens board.
Figure 7:
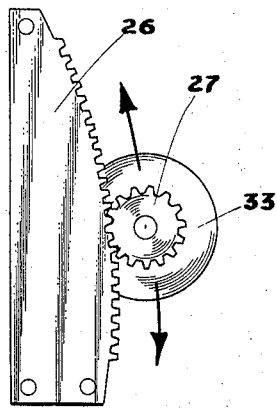
FIG. 7 shows one of the arcuate toothed racks and the pinion which engages the same.

Mounted on and fastened to the spindle 24 is a pulley 32 and a similar pulley 33 is fixed on the spindle 28. Passing around a groove in the pulley 32 is a cable 34 (see FIG. 5) which extends under a guide pulley or idler 35 rotative in the supporting frame. The cable 34 then passes upwardly to extend around a guide pulley 36; then having a stretch extending substantially horizontally, as clearly shown in FIG. 5, to pass around pulley 37 and then having its upper stretch attached to the yoke or guide piece 10 of the copy holder 9 as indicated at 38. At the opposite side of the yoke or guide piece 10 from its point of attachment thereat as indicated at 39, the cable 34 continues its upper stretch over a guide pulley 40 and then extends around a second groove in the guide pulley 35 to return to the pulley 32. The cable 34 is thus actually an endless cable with the copy holder 9 interposed in its upper stretch.

The pulley 33 has a cable 41 passing around it, said cable also passing around the guide pulleys 35, 36, 37 and 40, said cable being an endless cable with the guide member 7 of the camera lens holder interposed in its length.

Figure 3:
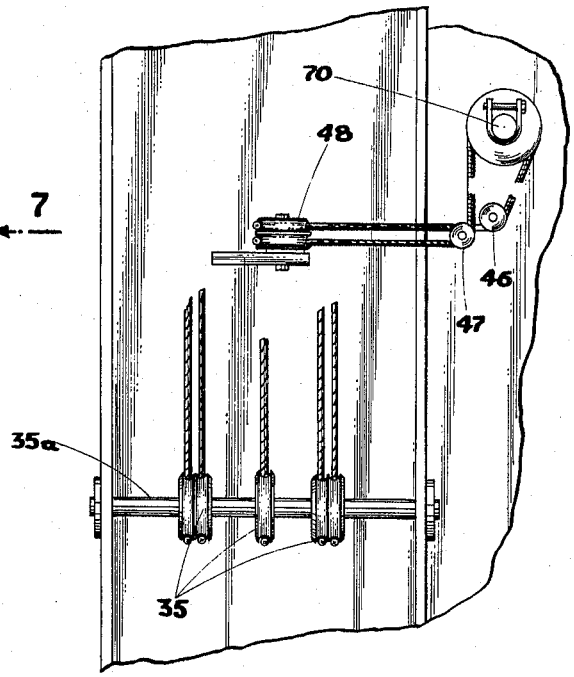
FIG. 3 is a sectional view, taken substantially on the line 3—3 of FIG. 1, looking in the direction of the arrows.

The means for moving the cam unit composed of the slotted cam plates 17 and 18, along their rails 15 and 16, includes a cable 44 guided over the pulleys 45, 46, 47, 48, 49, 50 and 51 and having its ends attached to the cam unit. The arrangement of the various pulleys for the accommodation of the cable 44 is disclosed in FIGS. 3, 9 and 10 wherein it will be noted that the pulleys 48 and 49 have vertical axes and that the pulleys 50 and 51 are secured on a crank shaft 53. A hand crank 52 on the crank shaft 53 (FIG. 10) is used to operate the cable and to cause the cam plate unit to be moved back and forth as required. A clamp or lock 70 can be provided for the crank shaft 53. As the cam plate unit is moved back, or toward the left in FIG. 1, one of the cam followers will rise in its cam slot while the other descends and the spindles 24 and 28 on which the pulleys 32 and 33 are respectively fixed, will be rotated to thereby rotate the pulleys 32 and 33 and cause the cables 34 and 41 respectively engaged thereby, to be moved in a manner to move the lens board and copy board toward or away from one another and toward or away from the film holder to the exact positions required for sharpness of the image and for image size.

Since the cam plate are attached together, focal length ratios are at all times automatically maintained for maximum optical sharpness of focus. Since they describe focal lengths, this arrangement will operate with any focal length lens.

Figure 8:
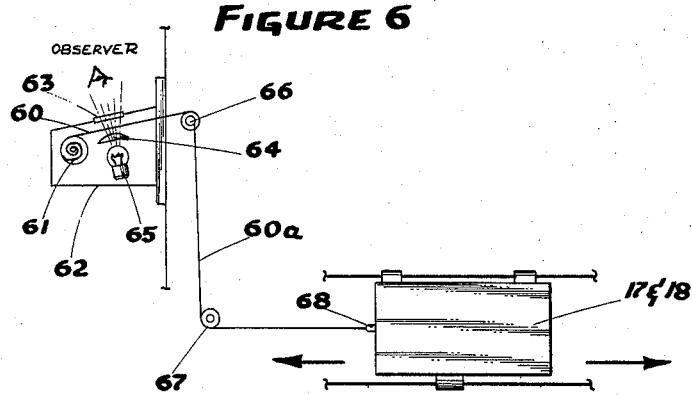
FIG. 8 shows the mechanism for moving the percentage tape.

At 60 is shown a percentage tape which serves to indicate the size of the copy being made, and which is spring wound on a take-up drum 61 contained in a housing 62 located at one end of the apparatus, said housing being provided with a viewing aperture 63. The tape passes between the viewing aperture 63 and a lens 64 behind which an illuminating lamp 65 is located. A cable 60a shown in FIG. 8, extends over guide pulleys 66 and 67 and attaches to the cam plate unit over a tensioned drum 68 thereon.

From the foregoing, the operation of the described structure will be readily understood. The percentage tape 60 is employed to determine the size of the copy to be made relatively to the size of the material being copied. Thus, when the tape indicates 100% in the viewing window 63, this shows that the size produced by the photographic copy will be full size. This takes place when the cam followers are at the "100%" positions in their respective slots as indicated in FIGS. 11 and 12. When the tape indicates 50%, this has reference to a half sized copy. Each of the cam slots 20 and 21 has a flat area 72 at the full size position and this enables quick re-setting to that position whenever full-size copy is desired.

When the crank 52 is manually operated, the cam unit, consisting of the connected cam plates 17 and 18, will be moved along on their supporting rails 15 and 16. For larger reproduction, the cam unit will be moved toward the right as indicated in FIGS. 11 and 12 and the cam followers, moving through their respective slots 20 and 21, will cause the rotation of their pinions 23 and 27 through the engagement of the same with the racks 22 and 26 and cause the lens holder and the copy holder to be moved toward one another and both away from film plane. Similarly, when the cam unit is moved toward the left by crank manipulation, the lens holder and the copy holder will be moved in a direction away from one another but lens toward film plane to secure smaller size reproduction.

The arcuate formation of the racks 22 and 26 is such as to prevent the imposition of stress on the cables which extend around pulleys 32 and 33 as these pulleys are raised and lowered along with their accompanying pinions during the movements of the cam unit.

Having thus described a single embodiment of the invention, it is obvious that the same is not to be restricted thereto, but is broad enough to cover all structures coming within the scope of the annexed claims.

What I claim is:

1. In a photographic apparatus, a cam unit consisting of connected, slotted cam plates, one of said plates having a cam slot appropriate to known formula for lens position, the second plate having a cam slot appropriate to known formula for copy positions, a cam follower operative in each of the slots, a pair of fixed gear racks between which the cam plates are movable, a pinion rotatively carried with each cam follower, the pinions respectively meshing with the racks and being rotated thereby the cam followers follow the contours of the cam slots, pulleys rotative with the pinions, and means driven from the pulleys and respectively connected to a lens board and a copy holder to move said lens board and copy holder toward or away from one another and toward and away from the film plane, as the cam unit is moved.

2. In a photographic apparatus as provided for in claim 1, including a crank and drive means between the same and the cam unit for moving the cam unit, and the means for moving the lens board and the copy holder toward or away from one another and away or toward the film plane consisting of cables driven from the pulleys and with said cables connected respectively to the lens board and copy holder.

3. A focusing and adjusting means for photographic apparatus comprising, a supporting frame, a lens board and a copy holder movably adjustable toward or away from one another and away or toward film plane, a pair of cam members movable in said frame below the lens board and copy holder, cam followers on which the cams are operative to cause raising or lowering of the cam followers, a pinion carried by each of the cam followers, fixed racks engaged by the pinions and causing said pinions to be respectively rotated during the raising and lowering movements under actuation of the cam members, pulleys coupled to the pinions, and cables extending about the pulleys and connected to the lens board and to the copy holder and effective to move the same during rotative movements of the cam members, whereby the cams are connected by slotted plates, the slot in one of the plates curving according to known focal ratios for lens and the slot in the second plate curving according to known focal ratios for copy, the gear racks being of arcuate formation, and crank means operative to move the cams back and forth in the frame.

4. A focusing and adjusting means as provided for in claim 3, wherein the racks are fixed and are arranged in spaced-apart parallel relation, the cam members being connected together and movable as a unit between the racks, the crank means being connected by a drive cable to the cams, and a frictional tape connected to the cams and tensioned by a take-up drum to which it is connected, and viewing means for inspecting the tape to determine image size.

5. A focusing and adjusting means for photographic apparatus comprising, a lens holder and a copy holder mounted for adjustment relatively to one another, and relative to the film holder, means for moving the objective holder and the copy holder toward or away from one another and toward or away from film plane comprising, a movable cam unit having curved cam slots, a pair of fixedly mounted racks, gears rotated by engagement with the racks and by movements of the cam unit, and cable driving connections between the gears and the objective holder and copy holder to thereby cause adjusting movement of the same when the gears are rotated, whereby the cam unit consists of a pair of connected slotted cam plates, said cam unit being movable between the racks, the slots in said cam plates being shaped to cause rotative movement of the gears by linear movements of the cam unit, the gears being mounted on spindles, pulleys on said spindles, and the drive between the gears and the objective holder and copy holder consisting of cables engaging the pulleys and respectively coupled to the objective holder and copy holder.

References Cited by the Examiner

UNITED STATES PATENTS

| | | | |
|---|---|---|---|
| 1,543,016 | 6/1925 | Lare | 88—24 |
| 1,821,923 | 9/1931 | Beidler | 88—24 |
| 2,291,613 | 8/1942 | Dye | 88—24 |
| 2,517,250 | 8/1950 | Shea et al. | |

NORTON ANSHER, *Primary Examiner.*

RICHARD A. WINTERCORN, *Assistant Examiner.*